United States Patent [19]

Caluori et al.

[11] Patent Number: 5,418,068
[45] Date of Patent: May 23, 1995

[54] MULTI-LAYER COMPOSITE FOR REUSABLE MULTI-LAYER PACKS

[75] Inventors: Hans-Jörg Caluori, Fläsch; Hans-Dalla Torre, Domat/Ems; Manfred Hewel, Rodels, all of Switzerland

[73] Assignee: EMS-Inventa AG, Switzerland

[21] Appl. No.: 966,299

[22] Filed: Oct. 26, 1992

[30] Foreign Application Priority Data

Oct. 31, 1991 [CH] Switzerland .................. 03172/91

[51] Int. Cl.⁶ .................. B32B 33/00; C08G 69/26
[52] U.S. Cl. .................. 428/474.4; 428/475.5; 528/847
[58] Field of Search .................. 428/474.4, 475.5; 528/847

[56] References Cited

U.S. PATENT DOCUMENTS

| | | | |
|---|---|---|---|
| 4,696,865 | 9/1987 | Richardson et al. | 428/474.4 |
| 4,826,955 | 5/1989 | Akkapeddi et al. | 528/208 X |
| 4,937,130 | 6/1990 | Clagett et al. | 428/474.9 |
| 4,983,719 | 1/1991 | Fox et al. | 528/339 |

*Primary Examiner*—P. C. Sluby
*Assistant Examiner*—David J. Abraham
*Attorney, Agent, or Firm*—Jordan B. Bierman; Bierman and Muserlian

[57] ABSTRACT

A multi-layer composite made of at least one copolyamide protective layer, and at least one copolyamide barrier layer, with the protective layer placed such that it is between the barrier layer and a source of moisture. The protective copolyamide layer is composed of a partially aromatic, amorphous copolyamide of a specified composition, and the barrier layer is composed of a partially aromatic barrier copolyamide of a specified composition. This multi-layer composite is especially useful in reusable packaging systems, such as beverage bottles or containers of any kind.

23 Claims, No Drawings

MULTI-LAYER COMPOSITE FOR REUSABLE MULTI-LAYER PACKS

The invention relates to a multi-layer composite for reusable multi-layer packages; in particular, those consisting of at least one boiling water-resistant transparent protective layer of copolyamide and at least one copolyamide layer. The invention is especially useful for food packages. More specifically, the invention comprises the combination of copolyamides having certain barrier properties with copolyamides of excellent boiling water stability to form a transparent multi-layer composite, and the use of this composite for the production of flexible or rigid reusable multi-layer packages.

In the packaging and food industry, as well as in the pharmaceutical field, there is a rising need for suitable plastic materials to replace glass and metal, e.g. for foods, beverages, and pharmaceuticals. The multi-layer packing systems employed in these areas contain, as a rule, several layers of various polymers such as polyethylenes, polypropylenes, polyvinyl chlorides; polyvinyl fluorides, polyvinyl alcohols, polyethylene terephthalates, polyethylene vinyl alcohols; polyamides, ionomers, polyesters, polycarbonates, polyacrylates, other polymers, and blends or mixtures thereof.

In general, these packing systems constitute protective and supporting systems for barrier layers for foods and beverages, as well as medicinal, chemical, biological, and pharmaceutical products. In the widest sense they include packing such as flexible tubes, pipes, bottles, containers, bags, cans, and similar receptacles.

However, for the above named applications, the plastic materials must, in addition to good processability, have good mechanical properties, and the barrier layer should be highly impermeable or resistant to oxygen, carbon dioxide, and water vapor. It should also be resistant to other gases and gas mixtures (toxic and non-toxic), such as aromatics, perfumes, and hydrocarbons. Very often, materials which are good oxygen barriers are permeable to water vapor; polar polymers which contain hydroxyl groups, such as cellophane and polyvinyl alcohol, constitute good barrier layers to oxygen. They are extremely hygroscopic and lose their barrier layer properties to a significant extent when they are moist. On the other hand, hydrophobic polymers such as polyolefins are good water vapor barriers, but their resistance to oxygen is poor. Polymers which have a balanced ratio of hydrophobic and hydrophilic structures, e.g. polyvinyl alcohols, ethylene vinyl alcohol copolymers, and nylons (PA 6 and 6.6), show very good barrier layer properties in media which have a low water vapor pressure but, as soon as the latter rises, a nylon barrier layer becomes oxygen-permeable, due to the plasticizing effect of the absorbed water.

From U.S. Pat. No. 4,826,955, barrier layers of an amorphous nylon copolymer are known. This copolyamide is composed of caprolactam, m-xylylene diamine, and terephthalic acid or isophthalic acid. Under the action of hot water, the barrier layer becomes intensely cloudy; the glass transition temperature (Tg) is reduced about 50° C. which causes the copolyamide to become thermally unstable.

U.S. Pat. No. 4,696,865 teaches that copolyamides of hexamethylene terephthalamide (6.T) and hexamethylene isophthalamide (6.I) are known for use in containers such as beverage bottles; these copolyamide layers have very good barrier properties to oxygen and carbon dioxide. The weight ratio of terephthalic acid to isophthalic acid in the above copolyamide is between 1.0 and 1.9, in particular between 1 and 1.5. The copolyamides have a glass transition temperature (Tg) of about 135 to 165° C., which, however, in the conditioned state, drops to below 100° C. As a result, cleaning processes with hot water at more than 60° C. cannot be carried out very well. For hygienic reasons, the cleaning must take place at at least 70° C.; hence, re-use of such contains is impractical or, at best, very limited. Moreover, the copolyamides in question are cloudy as a result of their manufacture, which for many types of packings is not acceptable.

In EP-A-378856, containers are described, the outer layers of which consist of polycarbonate, and the one inner barrier layer consists of a copolyamide of nylon 6.I/nylon 6.T (an amorphous polyamide of hexamethylene diamine and a phthalic acid composition which contains about 65 % by weight of isophthalic acid and 35% by weight of terephthalic acid). The copolyamide has a glass transition temperature of about 125° C. (dry) and less than 70° C. in the wet state. In contact with hot water, the copolyamide becomes cloudy and brittle, which also limits its re-usability.

From EP-A-358038, nylon blends, and single- and multi-layer films and containers which contain these nylon blends, are known. The layers are a blend of an amorphous copolymer of hexamethylene isophthalamide-terephthalamide and a crystalline copolyamide having a melting point of at least about 145° C. On the one hand, the softening point of this amorphous copolyamide drops due to the effect of the blend with the partially crystalline copolyamide. On the other hand, in the conditioned state, the blend has a much lower strength and hot form stability than in the dry state. Such alloys also become cloudy and brittle after repeated contact with hot water.

U.S. Pat. No. 4,937,130, shows polycarbonate beverage bottles which contain an intermediate layer of amorphous polyamide between the inner aromatic polycarbonate and the outer aromatic polycarbonate layers. The amorphous polyamide consists of hexamethylene diamine, isophthalic acid, terephthalic acid, and 1,4-bisaminomethyl cyclohexane, and has a glass transition temperature of about 105° C. In contact with hot water, however, this copolyamide also becomes turbid and brittle, which limits its re-usability. This is due to the fact that the hot water penetrates the polycarbonate layer and gets into the copolyamide layer, causing intense clouding and softening thereof.

From EP-A 409 666 or EP-A 411 791, polyamide compositions of improved gas barrier layer properties, i.e. improved oxygen barrier properties, are known. These polyamides consist of hexamethylene diamine and m-xylylene diamine, adipic acid, and possibly terephthalic acid units. The glass transition temperature of these copolyamides is approximately 90° C. Cleaning of a container having such a polyamide barrier layer with hot water at 70° to 80° C. for re-use is, therefore, not possible, as the polyamide layer softens and becomes milky.

A similar reaction to hot water is shown by the copolyamide which, according to U.S. Pat. No. 4,983,719, is produced from p-xylylene diamine, adipic acid, and isophthalic acid. While glass transition points of up to 170° C. are reached, they drop, when the copolyamide is wet, to under 100° C. Cleaning processes with hot water are not feasible because the copolyamide becomes cloudy and soft and, hence, is not reusable in solid packaging.

The need for suitable packing materials which have balanced barrier properties, i.e. good strength, high hot form stability, good washing resistance, high transparency, and suitability for reuse, is extremely great. Of special interest, is reusable packaging which is resistant to hot water, especially for intensively colored, carbon dioxide-containing products. All these requirements are fulfilled by the packing materials which are produced from multi-layer composites according to the invention.

BRIEF DESCRIPTION OF THE INVENTION

It is, therefore, the object of the invention to provide a multi-layer composite, especially for packaging food, of at least one copolyamide protective layer and at least one copolyamide barrier layer. On the one hand, the protective layer of the composite should have very high hot form stability, high strength, and ductility, dry as well as conditioned. On the other hand, it should be resistant to hot or boiling water in the range of 70° to over 95° C., and also resistant to hot water vapor, so that it does not become cloudy or brittle. The barrier layer of the composite should be highly impermeable or resistant to oxygen, carbon dioxide, and toxic and non-toxic gases, such as aromatics, perfumes, and hydrocarbons. This multi-layer composite is to be suitable for the production of flexible or rigid reusable multilayer packaging.

The new multi-layer composite for reusable multi-layer packaging consists of at least one boiling-water resistant, transparent copolyamide protective layer (which may be the outer layer, the inner layer, or both) and at least one copolyamide barrier layer. The protective layer prevents the middle barrier layer from becoming cloudy as a result of contact with hot water and/or water vapor; the inner layer acts as a barrier against oxygen, carbon dioxide, and other gases or vapors. The boiling-water stable, transparent protective layer is normally present internally and/or externally in such packaging or packaging systems, and consists of an amorphous copolyamide, preferably a copolyamide based on lactam-12, Laromin, and an aromatic dicarboxylic acid such as Grilamid TR 55, from Ems-Chemie AG.

Underlying the inventive selection of certain amorphous copolyamides and combinations thereof, is the need of the market for a comprehensive barrier against hot water, water vapor, oxygen, carbon dioxide, and toxic gases, particularly for fruit juices, preserves, and carbon dioxide-containing beverages. An important feature of the invention, therefore, is a reusable multilayer package, e.g. which is a combination of at least a reusable multilayer bottle, an inner and/or outer protective layer of a boiling-water stable copolyamide, preferably based on lactam-12, Laromin, and aromatic dicarboxylic acids (Grilamide TR 55 from Ems-Chemie AG), with at least one additional layer of a copolyamide with barrier properties.

Preferred applications are beverage bottles and containers in which the boiling water resistant copolyamide forms the inner layer and/or outer layer, the barrier copolyamide forms a central layer, and other layers formed from one or more different polymers, which may be, among others, polystyrene, polybutadiene, polyacrylic nitrile, or polycarbonate. The protective layer prevents boiling water and water vapor from contacting the barrier layer and causing it to become cloudy; the central layer constitutes a barrier against oxygen, carbon dioxide, and other gases or vapors.

An important object of this invention is the provision of reusable packaging systems. Beverage bottles or containers of any kind are subjected, after use, to washing with hot water, steam or alkaline cleaning solutions at 60° C. to 95° C. To reduce waste, e.g. of beverage packaging, reusable containers with protective and barrier layers according to the invention are, therefore, of great economic and ecopolitical importance.

It is further advantageous that the transparent barrier layer or protective layer copolyamides according to the invention have an index of refraction which can be adapted to the adjacent polymeric layer, so that the transparency of the multi-layer system is not impaired. The index of refraction of the polyamides of the protective and barrier layers can be adjusted within wide limits. As the protective layer is stable to boiling water and water vapor, it becomes possible to reuse the bottles and containers according to the invention, which can withstand 15 to 20 cleaning cycles at 80° and higher, or with steam or alkaline cleaning solutions at 60° C. to 95° C. for a cycle period of 15 to 20 minutes. In this manner the waste of polymers used in beverage packaging or in other non reusable packs, can be reduced considerably.

The protective layer is a partially aromatic, amorphous copolyamide comprising (1) 2 to 40 molar parts of (a) at least one long-chain aliphatic monomer having 6 to 40 carbon atoms, (b) at least one lactam having 9 to 12 carbon atoms, (c) at least one $\omega$-aminocarboxylic acid having 9 to 12 carbon atoms, or (d) dodecane diamine and dodecane diacid in nearly equimolar ratio;

(2) at least one cycloaliphatic diamine having 6 to 26 carbon atoms in substantially equimolar ratio with (3) at least one substituted or unsubstituted aromatic dicarboxylic acid having 8 to 20 carbon atoms, (1), (2), and (3) totaling 100 molar parts.

The barrier layer comprises a partially aromatic copolyamide, comprising (4) 0 to 40 molar parts of (a) at least one lactam having 6 to 12 carbon atoms, (b) at least one $\omega$-amino carboxylic acid having 6 to 12 carbon atoms, or (c) at least one aliphatic diamine having 6 to 12 carbon atoms in nearly equimolar ratio with at least one aliphatic dicarboxylic acid having 6 to 12 carbon atoms;

(5) at least one aliphatic diamine having 4 to 8 carbon atoms, which may be replaced up to 49% by weight, based on the aliphatic diamine, of at least one additional diamine, which is a cycloaliphatic diamine having 6 to 26 carbon atoms and/or by up to 40 molar %, based on said aliphatic diamine, of an araliphatic diamine having 6 to 26 carbon atoms, in substantially equimolar ratio with (6) at least one substituted or unsubstituted aromatic dicarboxylic acid having 8 to 20 carbon atoms. This aromatic dicarboxylic acid may be replaced by 0 to 20 molar parts of at least one aliphatic dicarboxylic acid having 4 to 8 carbon atoms, (4), (5), and (6) totaling 100 molar parts.

DETAILED DESCRIPTION OF THE INVENTION

Diamines and dicarboxylic acids are used as the monomer building blocks substantially in equimolar portions for the polyamides. The expert knows, however, that these proportions can vary within certain limits, depending on whether carboxyl or amino-group terminated copolyamides are desired.

The multi-layer composite according to the invention advantageously contains, in addition to the protective and barrier layers, one or more other polymer layers. They may consist of polymers selected from the group consisting of polyethylenes, polypropylenes, polyvinyl chlorides, polycarbonates, polyethyleneterephthalates, polyethylene styrenes, polyvinyl acetates, polyacrylic nitriles, polyvinyl alcohols, polysulfides, polysulfones, polyketones, and polystyrenes.

The barrier layer can be located between several identical or different layers, which may be protective or barrier layers. The multi-layer composite may contain several barrier layers of different copolyamides.

In a preferred embodiment, the amorphous copolyamide of the protective layer comprises at least one of each of the following classes of monomers:

(1) (a) Lactams, (b) ω-aminocarboxylic acids having 11 or 12 carbon atoms, or (c) dodecane diamine and dodecane diacid in substantially equimolar ratio, (2) unsubstituted or alkyl-substituted 4,4,-diaminodicyclohexylalkane, wherein the alkyl has 1 to 4 carbon atoms and the alkane has 1 to 3 carbon atoms, in substantially equimolar ratio with (3) terephthalic acid, which may be replaced by isophthalic acid and up to 15 molar % of at least one aliphatic dicarboxylic acid having 4 to 8 carbon atoms or at least one cycloaliphatic dicarboxylic acid having 8 to 20 carbon atoms, (1), (2), and (3) totaling 100 molar parts.

In another embodiment, the amorphous copolyamide of the protective layer is composed of at least one of each of the following classes of monomers:

(1) 2 to 40 molar parts of (a) lactams or (b) ω-aminocarboxylic acids having 9 to 12 carbon atoms and (2) at least one bis-(amino-cyclohexyl)-alkane or its alkylated derivatives having 6 to 24 carbon atoms in substantially equimolar ratio with (3) at least one aromatic dicarboxylic acid having 8 to 12 carbon atoms, which may be replaced by 0 to 15 molar % of at least one aliphatic dicarboxylic acid having 4 to 8 carbon atoms, (1), (2), and (3) totaling 100 molar parts.

The lactam (1) is preferably laurin lactam, the bis-(amino-cyclohexyl)-alkane (2) is preferably 4,4,-diamino-3,3'-dimethyl-dicyclohexyl-methane, and the aromatic dicarboxylic acid (3) is preferably terephthalic acid, isophthalic acid, or a mixture thereof.

Preferably, the long-chain aliphatic monomer (1) of the protective layer is a dimeric fatty acid having 28 to 40 carbon atoms, the cycloaliphatic diamine (2) is 4,4'-diamino-3,3'-dimethyl-dicyclohexyl-methane, 3-aminomethyl-3,5,5'-trimethyl-1-cyclohexylamine, or a mixture thereof, and the aromatic dicarboxylic acid (3) is terephthalic acid, isophthalic acid, or a mixture thereof. Terephthalic acid and isophthalic acid may be present in a molar ratio of 1:0 to 0:1, in particular in a molar ratio of 4:1 to 1:4. The dimeric fatty acid is combined with the cycloaliphatic diamine (2) in substantially equimolar ratio. Thus, in this particular case, (1), (2), and (3) are all present in equimolar amounts.

In still another embodiment, the copolyamide of the barrier layer comprises at least one of each of the following classes of monomers.

(4) 0 to 40 molar parts of (a) lactams having 6 to 12 carbon atoms, (b) ω-amino-carboxylic acids having 6 to 12 carbon atoms, or (c) aliphatic diamines having 6 to 12 carbon atoms in substantially equimolar ratio with aliphatic dicarboxylic acid having 6 to 12 carbon atoms, and (5) 30 to 50 molar parts of at least one short-chain aliphatic diamine having 4 to 8 carbon atoms, which may be replaced by up to 49% by weight, based on said short chain diamine, by a cycloaliphatic diamine and/or up to 40 molar %, based on said short-chain diamine, araliphatic diamine, in substantially equimolar ratio with (6) terephthalic acid, isophthalic acid, or a mixture thereof, which may be replaced by up to 20 molar % of an aliphatic dicarboxylic acid having 4 to 8 carbon atoms, (4), (5), and (6) totaling 100 molar parts.

Preferably, the copolyamide of the barrier layer contains building blocks of hexamethylene diamine and cycloaliphatic diamine in the molar ratio of 1:49 to 50:0. In a special embodiment, the copolyamide of the barrier layer contains:

(5) 50 molar parts of: 25 to 48 molar parts hexamethylene diamine and 2 to 25 molar parts 4,4'diamino-3,3'-dimethyldicyclohexylmethane and (6) isophthalic acid, terephthalic acid, or a mixture thereof, wherein the mixture may have a molar ratio of isophthalic acid to terephthalic acid of 1:4 to 4:1, (5) and (6) being present in a nearly equimolar ratio and totaling molar parts.

In another preferred embodiment of the invention, the copolyamide of the barrier layer contains:

(5) 50 molar parts of 10 to 40 molar parts hexamethylene diamine, 5 to 20 molar parts m-xylylene diamine, 5 to 20 molar parts 4,4'-diamino-3,3'dimethylcyclohexylmethane, and (6) isophthalic acid, terephthalic acid, or a mixture thereof, (5) and (6) being present in a nearly equimolar ratio and totaling 100 molar parts.

In another desirable embodiment, the copolyamide of the barrier layer contains:

(5) 50 molar parts of: 5 to 45 molar parts hexamethylene diamine and 5 to 45 molar parts m-xylylene diamine in a substantially equimolar ratio with (6) isophthalic acid, terephthalic acid, or a mixture thereof, (5) and (6) totaling 100 molar parts.

In a still further embodiment, the copolyamide of the barrier layer is composed of:

(4) 5 to 30 molar parts of laurin lactam or omega-amino-lauric acid and 70 to 95 molar parts of:

(5) hexamethylene diamine and 4,4'-diamino-3,3'-dimethylcyclohexyl methane in a molar ratio of 1:5 to 5:1, and (6) isophthalic acid, terephthalic acid, or a mixture thereof, (5) and (6) being present in nearly equimolar amounts and (4) and (5) totaling 100 molar parts.

In a special embodiment the copolyamide of the barrier layer is composed of substantially equimolar amounts of (5) hexamethylene diamine and (6) isophthalic acid, terephthalic acid, or a mixture thereof.

Advantageously, the copolyamide of the barrier layer is composed of:

(4) 20 to 70 molar parts of caprolactam or ω-aminocaproic acid, and
(5) 15 to 40 molar parts of hexamethylene diamine and 4,4'-diamino-3,3'-dimethyl-cyclohexyl-methane, the molar ratio thereof being 4:1 to 1:4, and
(6) 15 to 40 molar parts of isophthalic acid or terephthalic acid or a mixture thereof, the amount of (5) being substantially equimolar with (6), and (4), (5), and (6) total 100 molar parts.

The copolyamide of the barrier layer may also usefully be composed of
(4) 2 to 30 molar parts of caprolactam or ω-aminocaproic acid, and
98 to 70 molar parts of:

The following examples are intended to illustrate the invention, but do not limit it.

EXAMPLES 1 TO 9

A 150-liter autoclave, equipped with an agitator, thermocouple, nitrogen injector, and oil circulation heater, is charged with monomers of the compositions set forth in Table 1 and copolyamides 1 to 9 of the defined compositions are produced by polycondensation in the melt. They are then extruded as 50 μm flat foils, which were tested for oxygen and $CO_2$ permeability, and hot water and boiling water stability. The results are also found in Table 1. The conditioning referred to is at 70° C. and 100% relative humidity for 14 days.

TABLE 1

| | | | | Examples 1 to 9 | | | | |
|---|---|---|---|---|---|---|---|---|
| | | η rel. visc. 0.5 | Tg DSC °C. | $O_2$ cc/m²/d bar | | $CO_2$ cc/m²/d bar | Hot Water stable 80° C. | |
| Ex | Copolyamide Composition | m-cresol | dry | dry | cond. | dry | 6h | 24h |
| Ex 1 | HMD-IPS-TPS 3:2:1 | 1.52 | 125 | 30 | 8 | 70 | — | — |
| Ex 2 | HMD-Laromin-IPS-TPS 8:2:9:1 | 1.55 | 159 | 60 | 16 | 180 | + | — |
| Ex 3 | HMD-MXDA-IPS-TPS 7:3:7:3 | 1.50 | 138 | 22 | 7 | 47 | ○ | — |
| Ex 4 | HMD-MXDA-TPS 7:3:10 | 1.58 | 140 | 27 | 8 | 58 | ○ | — |
| Ex 5 | HMD-MXDA-Laromin IPS 5:3:2:10 | 1.40 | 168 | 47 | 15 | 47 | + | — |
| Ex 6 | LC6-MXDA-AS 10:1:1 | 1.60 | 55 | 16 | 28 | 53 | — | — |
| Ex 7 | LC6-MXDA-TPS 10:1:1 | 1.50 | 68 | 15 | 18 | 65 | — | — |
| Ex 8 | LC12-HMD-IPD TPS-IPS 4:5:3:5:3 | 1.55 | 145 | 35 | 20 | 205 | — | — |
| Ex 9 | LC12-Laromin-IPS-TPS 3:3:2.5:0.5 | 1.54 | 158 | 1000 | — | 4000 | +*) | +*) |

*)transparent and stable even at 100° C.
Characterization:
+ = stable without clouding or shrinking
○ = Partly stable, slight turbidity, slight shrinkage
— = not stable, strong turbidity and shrinkage
Laromin = (4,4'-diamino-3,3'-dimethyl-dicyclohexyl)-methane
AS = adipic acid
MXDA = m-Xylilene diamine
LC6 = caprolactam
LC12 = Lactam-12 or laurin lactam
IPD = isophoron diamine
HMD = hexamethylene diamine
IPS = isophthalic acid
TPS = terephthalic acid
TR55 = a copolyamide on the basis of Lactam-12, Laromin and aromatic dicarboxylic acids (5) 35 to 49 molar parts hexamethylene diamine and
(6) 5 to 20 molar parts adipic acid and 29 to 44 molar parts isophthalic acid, terephthalic acid, or a mixture thereof,
wherein (5) and (6) are present in equimolar quantities, and (4), (5), and (6) total 100 parts.

Reusable multi-layer packs, produced from the above described multi-layer composite, can be formed by at least one protective and at least one barrier layer, which may be separated from other layers or can form, with another polymer, a co-extrudate, a compound, or a mixture, and may be produced e.g. by coextrusion, deep drawing, blow molding or other comparable technology. The multi-layer composite according to the invention can be used for containers, bottles, cans, and similar receptacles.

The films of the copolyamides of Examples 1 to 8 have very good barrier properties for oxygen and $CO_2$, but in part (Examples 1, 6, 7, 8) poor hot-water stability. The inventive copolyamide (Example 9), which is based on lactam-12, Laromin, and aromatic dicarboxylic acids of the Grilamid TR 55 type), on the other hand, has poor barrier properties, but excellent hot water stability, even at 100° C.; i.e. it is stable to boiling water.

Transparent shaped bodies of the copolyamides of Example 9 were produced by extrusion blow-molding in combination with each of the copolyamides of Examples 1 to 8 to form multi-layer hollow bodies having loose layers. The composite films and the hollow bodies contain the Example 9 copolyamide as a boundary layers both outside and inside. In one hollow body, the inner layer was of the Example 9 copolyamide, while the outer layer consisted of polycarbonate based on bisphenol A, with a Melt Volume Index (MVI) of 2 cc/10 min. at 280° C., 3.8 kg (ISO Standard 1133) (Lexan PKG 1643).

The composite films were held for 24 and 48 hours in water at a temperature of 80° C. Neither cloudiness nor any appreciable shrinkage was observed. The hollow bodies were also washed for 24 and 48 hours with hot water at 70° C. to 80° C. without any clouding occurring.

While only a limited number of specific embodiments of the present invention have been expressly disclosed, it is, nonetheless, to be broadly construed and not to be limited except for the character of the claims appended hereto.

What we claim is:

1. A multi-layer composite containing at least one copolyamide protective layer and at least one copolyamide barrier layer laminated therewith, said protective layer being between said barrier layer and a source of moisture, said protective layer comprising a partially aromatic, amorphous protective copolyamide composed of at least one monomer taken from each of the following classes:
   (1) 2 to 40 molar parts of (a) at least one long-chain aliphatic monomer having 9 to 40 carbon atoms, (b) at least one lactam having 9 to 12 carbon atoms, (c) at least one ω-aminocarboxylic acid having 9 to 12 carbon atoms, and (d) at least one dodecane diamine and at least one dodecane diacid in substantially equimolar ratios,
   (2) at least one cycloaliphatic diamine having 6 to 26 carbon atoms, and
   (3) at least one substituted or unsubstituted aromatic dicarboxylic acid having 8 to 20 carbon atoms,
wherein (1), (2) and (3) total 100 molar parts, and (2), and (3) are present in substantially equimolar amounts; a barrier layer consisting essentially of at least one partially aromatic barrier copolyamide consisting essentially of at least one monomer taken from each of the following classes:
   (4) at least one short-chain aliphatic diamine having 4 to 8 carbon atoms which may be replaced by up to 49% by weight of at least one additional diamine selected from the group consisting of cycloaliphatic diamines having 6 to 26 carbon atoms, and/or by up to 40 molar % of at least one araliphatic diamine having 6 to 26 carbon atoms, and
   (5) at least one substituted or unsubstituted aromatic dicarboxylic acid having 8 to 20 carbon atoms, of which 0 to 20 molar parts may be replaced by at least one aliphatic dicarboxylic acid having 4 to 8 carbon atoms,
wherein (4) and (5) total 100 molar parts, and are present in substantially equimolar amounts.

2. The composition of claim 1 comprising a plurality of said protective layers, a plurality of said barrier layers, or both.

3. The composite of claim 1 comprising a plurality of said barrier layers of different copolyamides.

4. The composite of claim 1 wherein said protective copolyamide is composed of at least one monomer taken from each of the following classes:
   (1) (b) at least one lactam, (c) at least one ω-aminocarboxylic acid having 11 or 12 carbon atoms, and (d) at least one dodecane diamine and at least one dodecane diacid, and
   (2) unsubstituted or alkyl-substituted 4,4'-diaminodicyclohexyl-alkane, said alkyl having 1 to 4 carbon atoms and said alkane having 1 to 3 carbon atoms, and
   (3) terephthalic acid which may be replaced in whole or part by isophthalic acid and by up to 15 molar %, based on said terephthalic acid and/or said isophthalic acid, by at least one aliphatic dicarboxylic acid having 4 to 8 carbon atoms or at least one cycloaliphatic dicarboxylic acid having 8 to 20 carbon atoms.

5. The composite of claim 1 wherein said protective copolyamide is composed of at least one monomer taken from each of the following classes:
   (1) (b) at least one lactam, (c) at least one ω-aminocarboxylic acid having 11 or 12 carbon atoms, and (d) at least one dodecane diamine and at least one dodecane diacid, and
   (2) (a) at least one 4,4'-diaminodicyclohexylalkane, and (b) at least one alkyl-substituted 4,4'-diaminodicyclohexyl alkane, wherein said alkyl has 1 to 4 carbon atoms and said alkane has 1 to 3 carbon atoms, and
   (3) terephthalic acid which may be replaced in whole or part by isophthalic acid and up to 15 molar %, based on said terephthalic acid and/or said isophthalic acid, by at least one aliphatic dicarboxylic acid having 4 to 8 carbon atoms or at least one cycloaliphatic dicarboxylic acid having 8 to 20 carbon atoms.

6. The composite of claim 1 wherein said protective copolyamide is composed of at least one monomer taken from each of the following classes:
   (1) 2 to 40 molar parts of (b) at least one lactam and (c) at least one ω-aminocarboxylic acid having 9 to 12 carbon atoms, and
   (2) at least one bis-(amino-cyclohexyl)-alkane or at least one alkylated derivative thereof having 6 to 24 carbon atoms, and
   (3) at least one aromatic dicarboxylic acid having 8 to 12 carbon atoms which may be replaced by up to 15 molar % of at least one aliphatic dicarboxylic acid having 4 to 8 carbon atoms.

7. The composite of claim 5 wherein (1) is laurin lactam, (2) is 4,4'-diamino-3,3'-dimethyl-dicyclohexyl-methane, and (3) is terephthalic acid, isophthalic acid, or a mixture thereof.

8. The composite of claim 6 wherein (1) is laurin lactam, (2) is 4,4'-diamino-3,3'-dimethyl-dicyclohexyl-methane, and (3) is terephthalic acid, isophthalic acid, or a mixture thereof.

9. The composite of claim 1 wherein (1) is a dimeric fatty acid having 28 to 40 carbon atoms, and (2) is 4,4'-diamino-3,3'dimethyldicyclohexyl-methane, 3-aminomethyl-3,5,5'-trimethyl-1-cyclohexylamine, or a mixture thereof, and (3) is terephthalic acid, isophthalic acid, or a mixture thereof, (1) and (2) being present in substantially equimolar amounts.

10. The composite of claim 1 wherein (5) is selected from the group consisting of hexamethylene diamine, diamine-3,3'dimethyl-dicyclohexyl methane, and xylylene diamine.

11. The composite of claim 10 wherein (5) comprises hexamethylene diamine.

12. The composite of claim 1 wherein said barrier copolyamide diamine and cycloaliphatic diamine in a molar ratio of 1:49 to 50:0.

13. The composite of claim 1 wherein said barrier copolyamide comprises as building blocks:

(4) 50 molar parts of a composition comprising 25 to 48 molar parts hexamethylene diamine and 2 to 25 molar parts, 4,4'-diamino-3,3'-dimethyldicyclohexyl methane and (5) a mixture of isophthalic acid and terephthalic acid in a molar ratio of 1:4 to 4:1.

14. The composite of claim 1 wherein said barrier copolyamide comprises as building blocks:

(4) 50 molar parts of a composition comprising 10 to 40 molar parts hexamethylene diamine, 5 to 20 molar parts m-xylylene diamine, and 5 to 20 molar parts 4,4'-diamino-3,3'-dimethylcyclohexyl methane, and (5) isophthalic acid, terephthalic acid, or a mixture thereof.

15. The composite of claim 1 wherein said barrier copolyamide comprises as building blocks:

(4) 50 molar parts of a composition comprising 5 to 45 molar parts hexamethylene diamine, 5 to 45 molar parts m-xylylene diamine, and (5) isophthalic acid, terephthalic acid, or a mixture thereof.

16. The composite of claim 1 wherein said barrier copolyamide is composed of (4) hexamethylene diamine and (5) isophthalic acid, terephthalic acid, or a mixture thereof.

17. The composite of claim 1 wherein said barrier copolyamide is composed of at least one monomer taken from each of the following classes:

(4) 30 to 50 molar parts of at least one short-chain aliphatic diamine having 4 to 8 carbon atoms, which may be replaced by up to 49% by weight of at least one cycloaliphatic diamine and/or up to 40 molar % of at least one araliphatic diamine, and (5) terephthalic acid, isophthalic acid, or a mixture thereof, which may be replaced by up to 20 molar % of at least one aliphatic dicarboxylic acid having 4 to 8 carbon atoms.

18. The composite of claim 1 wherein said barrier copolyamide is composed of 70 to 95 molar parts of (4) hexamethylene diamine and 4,4'-diamino-3,3'-dimethyl-cyclohexyl methane in a molar ratio of 1:5 to 5:1, and (5) isophthalic acid, terephthalic acid, or a mixture thereof.

19. The composite of claim 1 wherein said barrier copolyamide is composed of (4) 15 to 40 molar parts hexamethylene diamine and 4,4'-diamino-3,3'-dimethyl-cyclohexyl methane, in a molar ratio of 4:1 to 1:4, and (5) 15 to 40 molar parts of isophthalic acid, terephthalic acid, or a mixture thereof.

20. The composite of claim 1 wherein said barrier copolyamide is composed of 98 to 70 molar parts of:

(4) 35 to 49 molar parts hexamethylene diamine, and (5) 5 to 20 molar parts adipic acid and 29 to 44 molar parts isophthalic acid, terephthalic acid, or a mixture thereof.

21. The composite of claim 1 comprising at least one additional layer of additional polymers, said additional layer being laminated with said composite.

22. The composite of claim 16 wherein said additional polymers are selected from the group consisting of polyethylenes, polypropylenes, polyvinyl chlorides, polycarbonates, polyethylene terephthalates, polyethylene styrenes, polyvinyl acetates, polyacrylic nitriles, polyvinyl alcohols, polysulfides, polysulfones, polyketones, and polystyrenes.

23. The composite of claim 16 wherein said additional layer is between a plurality of said protective layers or said barrier layers.

* * * * *